April 21, 1925.
H. L. INGERSOLL
1,534,450
CONTROLLING MECHANISM FOR BOOSTER MOTORS
Filed Oct. 15, 1920    2 Sheets-Sheet 1
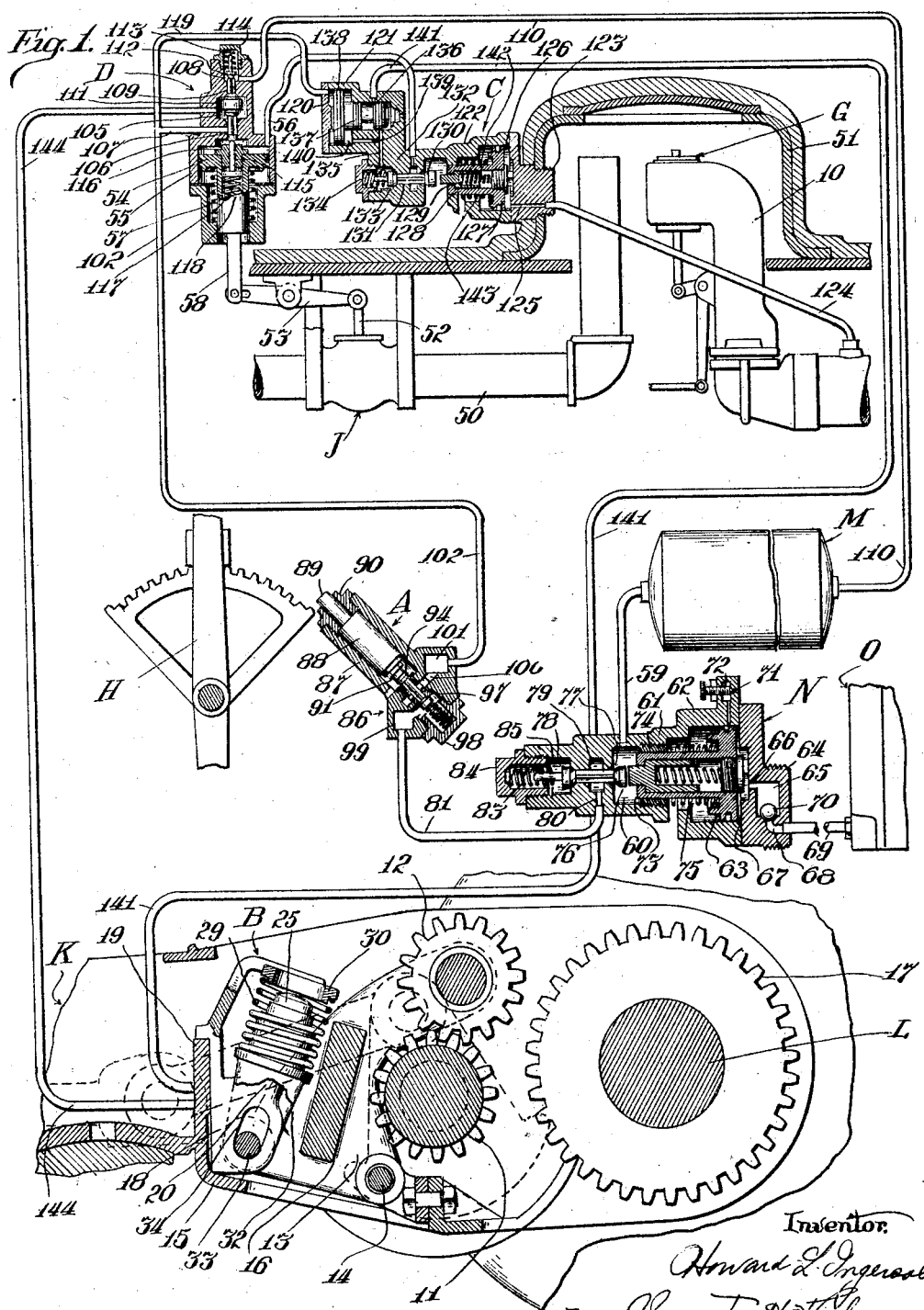

April 21, 1925.
H. L. INGERSOLL
1,534,450
CONTROLLING MECHANISM FOR BOOSTER MOTORS
Filed Oct. 15, 1920   2 Sheets-Sheet 2
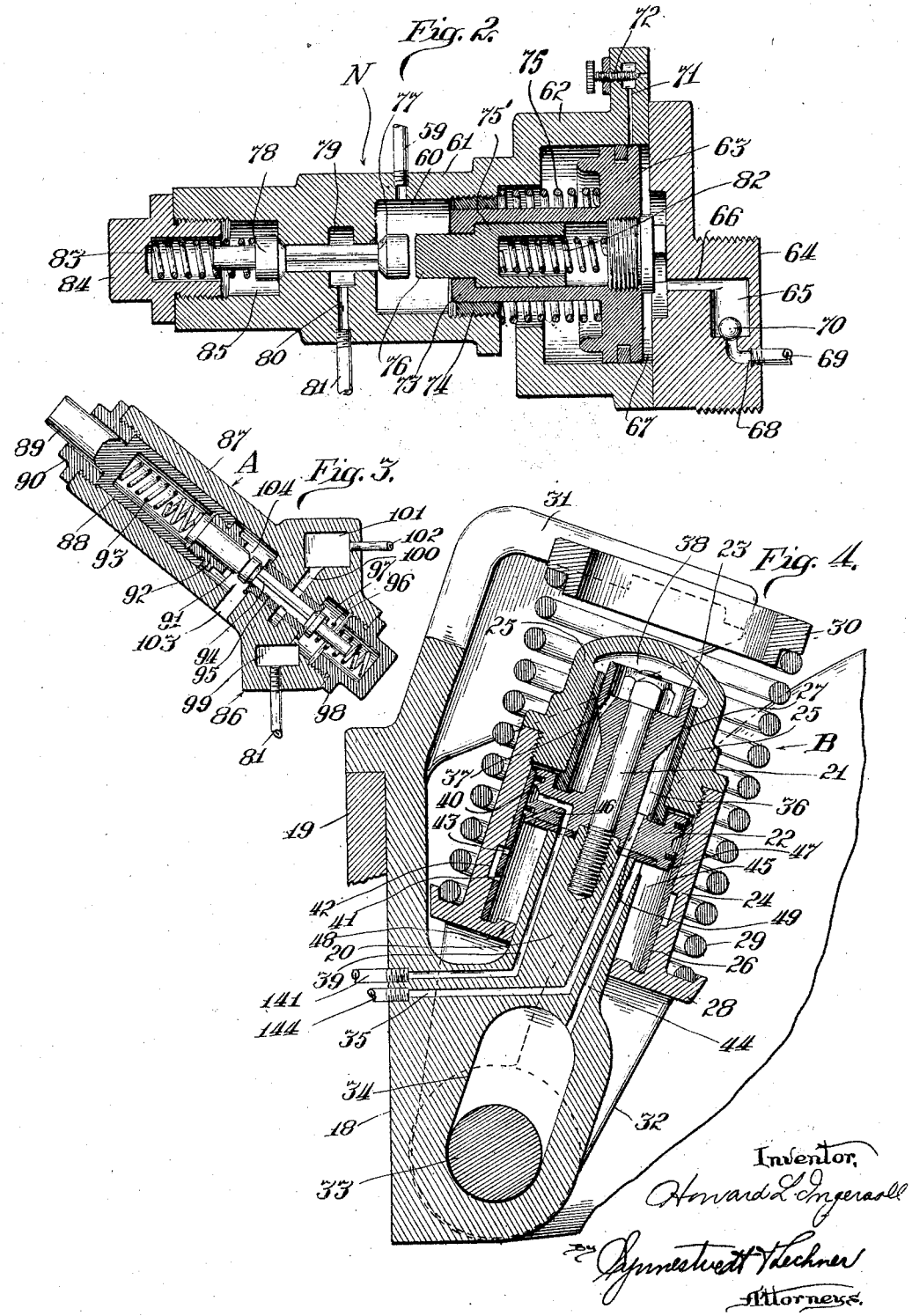

Patented Apr. 21, 1925.

1,534,450

UNITED STATES PATENT OFFICE.

HOWARD L. INGERSOLL, OF POUND RIDGE, NEW YORK.

CONTROLLING MECHANISM FOR BOOSTER MOTORS.

Application filed October 15, 1920. Serial No. 417,214.

*To all whom it may concern:*

Be it known that I, HOWARD L. INGERSOLL, a citizen of the United States, residing at Pound Ridge, in the county of Westchester and State of New York, have invented certain new and useful Improvements in Controlling Mechanism for Booster Motors, of which the following is a specification.

My invention relates to an auxiliary or booster motor for a locomotive, the function of which is to aid the main driving means in starting the locomotive and propelling the same at low speeds, this invention being particularly concerned with the mechanism employed for controlling the operations of the booster.

The principal object of the invention is to provide, in connection with the apparatus for setting the booster motor in operation, a device operated by fluid pressure from a cylinder of the main driving means of the locomotive, for automatically putting the booster motor out of operation when the locomotive attains a given speed and for, furthermore, preventing the booster motor from being cut in again while this relatively high speed is maintained. The device is employed, preferably, in addition to the normal means for cutting out the booster through manipulation of the instrumentalities used for controlling the main driving means of the locomotive and it is, therefore, in the nature of a safety feature to make it certain that under no conditions can the booster be put into operation or maintained in operation when the locomotive is running (either under steam or drifting) at such speed, as might involve injury to the booster or its driving connections.

A further object of the invention is to provide an improvement upon the booster control system disclosed in patents issued to me numbered 1,339,395 and 1,339,513, both granted May 11, 1920. My present invention uses instead of the centrifugal governing means shown in Patent 1,339,513 a device actuated by pressure from a cylinder of the main driving means of the locomotive for shutting off air supply to the booster controlling mechanism and thereby disabling the same at certain locomotive speeds.

The invention is illustrated, in a preferred embodiment, in the accompanying drawings wherein—

Fig. 1 is a diagrammatic view, with parts shown in section and parts in elevation, illustrating the entire controlling apparatus as applied to a locomotive and its booster.

Fig. 2 is a sectional view, on an enlarged scale, of the governing device which constitutes the novel feature of the controlling mechanism of this invention.

Fig. 3 is a similar view of the controlling device of the booster control system that is actuated by the reverse lever, and Fig. 4 is a similar view of the entraining motor.

Like characters of reference designate like parts in the several figures of the drawings.

Referring first to Fig. 1, A designates a controlling device of the booster control system, that is actuated by the reverse lever H of the locomotive. B is the motor for entraining the booster engine K with the locomotive axle L which it is designed to drive, this axle being preferably the axle of the trailer truck of the locomotive. C is a controlling device actuated in part by air passing controller A and in part by steam pressure admitted to the locomotive dry pipe 10 when the main throttle G of the locomotive is opened. The controlling device C governs the supply of steam to the booster. D is the motor for operating the booster throttle valve J. M is a compressed air reservoir for supplying motive fluid to the various devices of the booster control system. N is the governing device constituting the novel feature of my present invention interposed between one of the main cylinders O of the locomotive and the controlling device A and operated through pressure developed in cylinder O, either steam pressure, when the main driving means of the locomotive is supplied with steam, or air pressure when the locomotive is drifting, to cut out the booster when the locomotive has attained a certain speed.

The booster motor, shown fragmentarily at K, is adapted to drive a gear wheel 11 meshing with a gear wheel 12 carried by a rocking member 13 pivoted at 14 to the booster motor supporting structure 15, the rocking member being weighted at 16 so that the gear 12 is normally out of mesh with the gear wheel 17 on the trailer truck axle L. The rocking member is moved on its pivot 14 to bring gear 12 into mesh with gear 17 by means of a motor B.

The booster engine entraining motor B is constructed as follows (Fig. 4): 18 is a bracket member secured to a web 19 on the booster motor supporting structure 15 and formed with an upwardly projecting stem 20 to which is secured by bolt 21 a stationary double piston structure 22, 23. Surrounding the stem and pistons is a double cylinder structure 24, 25, the cylinders being provided interiorly with bushing 26, 27 respectively, which work against pistons 22, 23. Cylinder 24 is formed with a flange 28 and a coiled spring 29 is interposed between this flange and a spring seat 30 formed on an arm 31 projecting from bracket 18. The cylinder 24 is formed with a depending fork 32, the members of which are connected by a cross pin 33 engaging the rocking member 13, this cross pin being movable in a slot 34 in the bracket 18. The upward movement of cylinder structure 24, 25 rocks member 13 so as to mesh gear 12 with gear 17 on the axle L. When the cylinders are moved downwardly by spring 29 the rocking member 13 is moved by gravity to disengage gear 12 from gear 17. To raise the cylinders compressed air is introduced through a duct 35 into the space 36 between the pistons 22 and 23. From here it passes through port 37 into the space 38 above piston 23. The pressure of air overcomes the pressure of spring 29 and the cylinders are thereupon raised. Piston 22 and stem 20 are formed with a duct 39, the portion in the piston 22 extending to a peripheral groove 40 in said piston. When the cylinders are raised this groove registers with the lower opening 41 of a duct 42 in the cylinder wall, the upper opening 43 of which will be above the top of piston 22. When the cylinders are raised compressed air from duct 35 will pass out through duct 39 to the motor D for operating the booster engine throttle, as will be hereinafter described. 44 is an exhaust port from the space 45 below piston 22. 46 is a port extending from duct 39 to a space 47 formed by diminishing the diameter of the lower part of piston 22. The purpose of this port is to permit the exhaust of duct 39 and its connections when the cylinders return to their normal position. When they are raised duct 46 is sealed from exhaust port 44 by seat 48 coming in contact with a packing member 49 on the under side of piston 22.

The booster throttle valve J is arranged within the boiler between the sections of a dry pipe 50 which extends into the steam dome 51. The stem 52 of valve J is connected with a lever 53, this lever being rocked by the motor D.

The booster engine throttle operating motor D is constructed as follows: 54 is a piston operating in a cylinder 55 to which compressed air is supplied through a pipe 56. A spring 57 tends to return piston 54 to its upper or normal position. Piston 54 has an extension 58 connected with the lever 53. Associated with the motor D are certain valves which will be described in connection with the apparatus for controlling the application of compressed air to the entraining motor B and said booster throttle valve operated motor D. These several controlling mechanisms may be described most conveniently by considering them in the order in which the air passes through them from the air supply tank M to the motors B and D. Air from tank M passes first through a pipe 59 to a chamber 60 in the controlling device N.

The controlling device N which functions to shut off air pressure to the booster control system when the locomotive attains a certain speed is constructed as follows (Fig. 2): 61 is a casing formed in one end with a cylinder 62 in which is arranged a piston 63, the cylinder being closed by a head 64 in which is formed a valve chamber 65 communicating by duct 66 with the space 67 within the cylinder and connected by duct 68 and pipe 69 with one of the main cylinders O of the locomotive. 70 is a ball check valve in chamber 65 adapted to prevent return of pressure from the space 67 to the main cylinder O. The wall of cylinder 62 is formed with a port 71 the effective size of the outlet of which is controlled by a needle valve 72. Piston 63 is formed with a hollow stem 73 which projects into the space 60 within casing 61 through a bushing 74. A coiled spring 75 is interposed between this bushing and the piston 63. Within the hollow stem 73 of piston 63 is arranged a plunger 75' formed with a stud 76 adapted to bear against one end of a double valve 77, 78 which controls the flow of pressure fluid from space 60 to a space 79 connected by port 80 and pipe 81 with the controlling device A operated by the reverse lever H. A spring 82 is interposed between piston 63 and plunger 76. A spring 83 is interposed between the valve 78 and a cap 84 closing the chamber 85 within which valve 78 is located. Unless the pressure held in space 67 is sufficient to thrust piston 63 backwardly against its spring 75 compressed air will pass from pipe 59 through chamber 60 into chamber 79 and out through pipe 81 to the controlling device A. If, however, the locomotive has developed sufficient pressure in the space 67 to move piston 63 to the left (Fig. 2) the plunger 76 will abut against valve 77 seating the same and shutting off communication between pipes 59 and 81. This shuts off air from the controlling apparatus of the booster motor, the parts of which resume their normal positions so that the booster motor will be disabled.

The controlling device A, actuated by the reverse lever H, is constructed as follows: 86 is a casing formed with a cylinder 87 within which is a piston 88 formed with a stud 89 projecting through a cap piece 90 at the upper end of the cylinder. This stud is adapted to be engaged by the reverse lever H when the latter is put into its extreme forward position, whereby the piston 88 is depressed. The piston 88 is hollow and in the lower end of the same is arranged a plunger 91 normally held against a cap piece 92 by means of a coiled spring 93. The plunger 91 is adapted to engage a double valve device 94 arranged in a port 95 formed in the casing 86. The double valve 94 is normally held with its lower end seated by means of a spring 96 arranged in a chamber 97 and bearing against a cap piece 98. Pipe 81 leads to a port 99 communicating with chamber 97. A port 100 leads to a chamber 101 with which is connected a pipe 102 which leads to the valve mechanism associated with the booster throttle valve operating motor D and the controlling device C. Depression of piston 88 unseats the lower valve of valve device 94 and seats the upper valve. 103 is a port from the chamber 104 above valve device 94 to the atmosphere.

The valve mechanism associated with the booster throttle valve operating motor D is constructed as follows: 105 is a chamber in the casing 55 to which leads a port 106 connected by a branch pipe 107 with pipe 102. 108 is a chamber connected by port 109 with chamber 105. A pipe 110 leads from the compressed air tank M to chamber 108. A double valve 111 is arranged in chamber 105 with its guiding stems extending into ports 106 and 109. In chamber 108 is a plunger 112 bearing against the upper stem of valve 111, and 113 is a spring interposed between this plunger and a cap piece 114. Arranged in the piston 54 is a plunger 115 extending through a plug 116 in the piston and forced against the lower stem of valve 111 by a coiled spring 117 located in the hollow portion 118 of the piston. Spring 117 is stronger than spring 113 so that normally valve 111 is moved from its lower seat against its upper seat. A pipe 119, which is a continuation of pipe 102, extends to the space 120 in a cylinder 121 forming part of the controlling device C.

The controlling device C, the function of which is to prevent the booster throttle valve from being opened except when steam is supplied to the main driving means of the locomotive, is constructed as follows: 122 is a cylinder having a boss 123 extending into and secured to the steam dome 51 of the locomotive. A pipe 124 leads from the main dry pipe 10 of the locomotive to a port 125 formed in the boss 123, the port leading to a space 126 in cylinder 122. 127 is a piston in cylinder 122 having a hollow stem 128 in which is arranged a plunger 129, the end of which projects through the end of the stem 128 and is adapted to engage one end of a double valve 130 arranged in a port 131 formed in a casing member 132 attached to the cylinder 122. Pipe 56 leads from port 131 to the air space in motor D above its piston 54. The double valve 130 extends into a chamber 133 in which is arranged a spring 134 bearing against the valve. A port 135 leads from chamber 133 to a chamber 136 in which is arranged the diminished end 137 of a piston valve 138, the larger end of which works in cylinder 121. A port 139 leads from port 135 to the space 140 in cylinder 121 to the right of piston 138. 141 is a pipe connecting the duct 39 of the entraining motor B with the chamber 136. This pipe 141 is blocked off from port 135 when the piston valve 137, 138 is in its normal position at the left hand end of cylinder 121. The plunger 129 which operates the double valve device 130 is provided with a cushioning spring 142. Piston 127 is normally held to the right hand end of cylinder 122 by a spring 143. 144 is a pipe leading from chamber 105 to the inlet port 35 of motor B.

The operation of the apparatus above described is as follows: In starting up the locomotive the engine man moves the reverse lever H to the extreme forward position and opens the main throttle G. The reverse lever depresses piston 88 seating the upper valve of the double valve member 94 and unseating the lower valve thereof. Compressed air from tank M will now flow through pipe 59, chamber 60 (controlling device N being inactive) ports 79 and 80, pipe 81, chambers 99 and 97 of the controlling device A, port 100 and chamber 101 of the controlling device A, pipe 102 to pipes 107 and 119. From pipe 107 the air passes into chamber 105 of the motor D, valve 111 being raised. From chamber 105 the air flows through pipe 144 to the inlet port 35 of the entraining motor B, raising the cylinder 24, 25 thereof against the force of spring 29 and thereby causing the rocking member 13 to be turned on its pivot 14 to mesh gear 12 with the gear 17 on the locomotive axle L. The booster is now entrained with the locomotive and ready to aid in starting the same as soon as it receives steam.

When the cylinder 24, 25 reaches the upper limit of its travel port 40 registers with port 41 and port 43 stands above piston 22. Pressure from space 36 can now pass into the outlet duct 39 and through pipe 141 to the chamber 136 in the controlling device C. It can enter this chamber because when air pressure was admitted to pipe 102 it passed through pipe 119 to cylinder 121 and moved the piston valve 137, 138 to the right. From chamber 136 the air passes through port 135 to chamber 133. Here it is blocked until such time as steam shall have been admitted to the main dry pipe 10, by the opening of the main throttle G with sufficient pressure to move piston 127 of controller C to the left. This movement of piston 127 unseats the left hand valve of the double valve device 130 and seats the right hand end. Air pressure from chamber 133 will now pass into pipe 56 and to the motor D, depressing piston 54 of the motor and opening the booster throttle valve J. The booster is now in operation. It will be observed, however, that when piston 54 is depressed valve 111 will be seated against its lower seat shutting off communication between pipe 107 and pipe 144. However, this movement of valve 111 opens communication between pipe 110, which is directly connected with the pressure supply tank M and pipe 144 so that the change of position of valve 111 does not involve any functional change in the booster controlling mechanism so long as the reverse lever remains in its forward position and the main throttle open.

After the locomotive has attained a certain speed, usually about ten or twelve miles per hour, the engineer hooks back the reverse lever to shorten the valve movement of the main driving means. This results in shifting the position of the double valve 94 of controller A, shutting off communication between pipe 81 and pipe 102. The air in pipes 102 and 119 and space 120 exhausts through the exhaust port 103 of valve device A and piston 138 is moved to the left by pressure exerted through port 139. This shuts off communication between pipe 141 and pipe 56 with the result that the booster throttle controlling motor D is relieved of pressure and the booster throttle valve closed. Valve 111 is raised by piston 54 closing communication between the pipe 110 leading from the supply tank M and pipe 144 which leads to the inlet duct 35 of the entraining motor B and the cylinder of the motor relieved of pressure is returned to its normal position by spring 29. The rocking member 13 carrying gear 12 is rocked backwardly by gravity, disengaging gear 12 from the gear wheel 17 on the locomotive axle. The port 46 of the motor B provides an exhaust for the air in the pipe 141 and chamber 136, the air passing into chamber 45 from port 46 and then to the atmosphere through port 44.

Should the engine man close his main throttle without changing the position of the reverse lever, the steam supply to the booster is cut off without, however, disentraining the booster from the locomotive. When main throttle G is closed the fall of pressure in the main dry pipe 10 allows piston 127 to be moved to the right by its spring 143 and the double valve 130 is moved to close communication between port 135 and pipe 56, the latter being vented to the atmosphere through port 131. This relieves the booster throttle controlling motor D of pressure without, however, affecting the pressure exerted against the entraining motor B since the shifting of valve 111 from its lower to its upper position involves merely the supply of pressure to pipe 144 from pipes 107, 102 instead of from pipe 110.

The function of the controlling device N which constitutes the subject matter of my present invention (the other parts of the apparatus not being claimed herein except in combination with the control feature provided by controlling device N), is to provide a purely automatic means for cutting off steam to the booster and disentraining it from the locomotive whenever the locomotive, regardless of the position of the reverse lever, attains a certain speed, the device further operating to prevent the booster from being put into operation so long as the locomotive is run at such relatively high speed. The device N in the present controlling system is, therefore, a primary controller, being interposed between the supply tank M and controller A. When the locomotive attains a certain speed the amount of steam pressure (or air pressure if the locomotive is drifting) held in chamber 67 will increase through the pumping action of the piston in cylinders O until this developed pressure, which at high speeds may be considerably greater than the steam pressure normally admitted to the cylinder, operates to move piston 63 to the left (Figs. 1 and 2). The building up of the pressure in chamber 65 is regulatable by adjustment of the needle valve 72 in the port 71 which governs the escape of the fluid from said chamber. Consequently the adjustment of this valve will determine the engine speed at which piston 63 is moved from right to left. The movement of piston 63 to the left causes the valve 77 to seat, thereby closing communication between pipe 59 and pipe 81. When this occurs the supply of steam to the booster motor will first be cut off and thereafter the booster will be disentrained from the locomotive the same as though the reverse lever had been hooked up to operate the valve of controller A. The formation of a vacuum in the main cylinder of the engine, which will occur under certain conditions, does not affect the pressure in chamber 67 because of the interposition of check valve 70 between the chamber and pipe 69.

I claim:

1. In combination with the main driving means of a steam propelled locomotive and a booster motor for aiding the main driving means in starting the locomotive and propelling the same at low speeds; pressure controlled means actuated from the cylinder of the main driving means which operates, when subjected to pressure above a given pressure, to put the booster motor out of operation.

2. In combination with the main driving means of a steam propelled locomotive and a booster motor for aiding the main driving means in starting the locomotive and propelling the same at low speeds; controlling mechanism for setting and maintaining the booster motor in operation, and means actuated by pressure in the cylinder of the main driving means for causing the controlling means to put the booster motor out of operation and keep the same out of operation until said pressure is diminished.

3. In combination with the main driving means of a steam propelled locomotive and a booster motor for aiding the main driving means in starting the locomotive and propelling the same at low speeds; a fluid pressure operated controlled mechanism for the booster, and a device actuated by pressure developed in the main cylinder of the locomotive for governing the supply of pressure fluid to said controlled mechanism.

4. In combination with the main driving means of a steam propelled locomotive and a booster motor for aiding the main driving means in starting the locomotive and propelling the same at low speeds; pressure controlled means actuated from the cylinder of the main driving means which, when subjected to pressures above a given pressure, prevents the booster motor from functioning, and means for adjustably varying the application of pressure from the cylinder to said pressure controlled means.

5. In combination with the main driving means of a steam propelled locomotive and a booster motor for aiding the main driving means in starting the locomotive and propelling the same at low speeds; fluid pressure controlled mechanism for setting and maintaining the booster motor in operation, means actuated by pressure in the cylinder of the main driving means for causing the controlling means to put the booster motor out of operation and keep the same out of operation until said pressure is diminished, and means for adjustably varying the application of pressure from the cylinder to said pressure controlled means.

6. In combination with the main driving means of a steam propelled locomotive and a booster motor for aiding the main driving means in starting the locomotive and propelling the same at low speeds; a fluid pressure controlled mechanism for the booster, a valve adapted to shut off a supply of pressure fluid thereto, and fluid pressure controlled means actuated from a cylinder of the main driving means which operates at pressures above a given pressure to close said valve.

7. In combination with the main driving means of a steam propelled locomotive and a booster motor for aiding the main driving means in starting the locomotive and propelling the same at low speeds; a fluid pressure controlled mechanism for the booster, a valve adapted to shut off a supply of pressure fluid thereto, and fluid pressure controlled means actuated from a cylinder of the main driving means which operates at pressure above a given pressure to close said valve, said pressure controlled means being provided with an adjustable bleeding port, for the purpose described.

8. In combination with the main driving means of a steam propelled locomotive and a booster motor for aiding the main driving means in starting the locomotive and propelling the same at low speeds; fluid pressure controlled mechanism for the booster, a valve adapted to shut off a supply of pressure fluid thereto, fluid pressure controlled means actuated from a cylinder of the main driving means which operates at pressures above a given pressure to close said valve, and a check valve to prevent the return of fluid pressure from the pressure controlled means to said cylinder.

9. In combination with the main driving means of a steam propelled locomotive and a booster motor for aiding the main driving means in starting the locomotive and propelling the same at low speeds; fluid pressure controlled mechanism for the booster, a valve adapted to shut off a supply of pressure fluid thereto, fluid pressure controlled means actuated from a cylinder of the main driving means which operates at pressures above a given pressure to close said valve, said pressure controlled means being provided with an adjustable bleeding port, for the purpose described, and a check valve to prevent the flow of fluid pressure from the pressure controlled means to said cylinder.

10. In combination with the main driving means of a steam propelled locomotive and a booster motor for aiding the main driving means in starting the locomotive and propelling the same at low speeds; fluid pressure controlled mechanism for the booster, a source of supply of pressure fluid therefor, a valve to shut off the flow of pressure from the source of supply to the controlling mechanism, and a cylinder having a piston therein adapted to bear against and close said valve, said cylinder being connected with a cylinder of the main driving means of the locomotive so that the piston therein is subject to pressures above atmospheric pressure developed in said cylinder of the main driving means.

11. In combination with the main driving means of a steam propelled locomotive and a booster motor for aiding the main driving means in starting the locomotive and propelling the same at low speeds; a fluid pressure controlled mechanism for the booster, a source of supply of pressure fluid therefor, a valve to shut off the flow of pressure from the source of supply to the controlling mechanism, and a cylinder having a piston therein adapted to bear against and close said valve, said cylinder being connected with a cylinder of the main driving means of the locomotive so that the piston therein is subject to pressures above atmospheric pressure developed in said cylinder of the main driving means, said first mentioned cylinder being provided with an adjustable bleeding port.

12. In combination with the main driving means of a steam propelled locomotive and a booster motor for aiding the main driving means in starting the locomotive and propelling the same at low speeds; a fluid pressure controlled mechanism for the booster, a source of supply of pressure fluid therefor, a valve to shut off the flow of pressure from the source of supply to the controlling mechanism, a cylinder having a piston therein adapted to bear against and close said valve, said cylinder being in communication with a cylinder of the main driving means of the locomotive, and a check valve arranged to prevent return of pressure from said first mentioned cylinder to the cylinder of the main driving means.

13. In combination with the main driving means of a steam propelled locomotive and a booster motor for aiding the main driving means in starting the locomotive and propelling the same at low speeds; a fluid pressure controlled mechanism for the booster, a source of supply of pressure fluid therefor, a valve to shut off the flow of pressure from the source of supply to the controlling mechanism, a cylinder having a piston therein adapted to bear against and close said valve, said cylinder being in communication with a cylinder of the main driving means of the locomotive, said first mentioned cylinder being provided with an adjustable bleeding port, and a check valve arranged to prevent return of pressure from said first mentioned cylinder to the cylinder of the main driving means.

14. In combination with the main driving means of a locomotive, the reverse lever thereof, and a booster motor for aiding the main driving means in starting the locomotive and propelling the same at low speeds; fluid pressure actuated devices for controlling the operation of the booster motor, a source of supply of pressure fluid therefor, a valve controlled by the reverse lever for admitting and shutting off pressure fluid to said booster motor controlling device, and a pressure operated controller actuated through pressure changes in one of the cylinders of the main driving means which is interposed between the source of supply of pressure fluid and said reverse lever controlled valve for governing the flow of pressure fluid to said valve.

15. In combination with the main driving means of a locomotive, the reverse lever thereof, and a booster motor for aiding the main driving means in starting the locomotive and propelling the same at low speeds; fluid pressure actuated devices for engaging the booster motor with the locomotive and disengaging the same therefrom and for controlling the supply of motive power to the booster, a source of supply of pressure fluid, a valve controlled by the reverse lever for admitting and shutting off pressure fluid to said booster motor controlling device, and a pressure operated controller actuated through pressure changes in one of the cylinders of the main driving means which is interposed between the source of supply of pressure fluid and said reverse lever controlled valve for governing the flow of pressure fluid to said valve.

16. In combination with the main driving means of a locomotive and a booster motor for aiding the main driving means in starting the locomotive and propelling the same at low speeds; fluid pressure actuated devices for controlling the operation of the booster motor, a source of supply of pressure fluid therefor, a conduit leading from said source of supply to said controlling device, two valves to govern the flow of pressure fluid through said conduit, and a pressure operated controller actuated through pressure changes in one of the cylinders of the main driving means for operating the one of said two valves which is nearer the source of supply of pressure fluid.

17. In combination with the main driving means of a locomotive and a booster motor for aiding the main driving means in starting the locomotive and propelling the same at low speeds; fluid pressure actuated devices for engaging the booster motor with the locomotive and disengaging the same therefrom and for controlling the supply of motive power to the booster, a source of supply of pressure fluid therefor, a conduit leading from said source of supply to said controlling device, two valves to govern the flow of pressure fluid through said conduit, and a pressure operated controller actuated through pressure changes in one of the cylinders of the main driving means for operating the one of said two valves which is nearer the source of supply of pressure fluid.

In testimony whereof, I have hereunto signed my name.

HOWARD L. INGERSOLL.